US012657248B2

(12) United States Patent
Boudia et al.

(10) Patent No.: US 12,657,248 B2
(45) Date of Patent: Jun. 16, 2026

(54) DEVICE, SYSTEM, AND METHOD FOR SECURE ASSISTIVE HANDLING OF ELECTRONIC CONTENT

(71) Applicant: AMADEUS S.A.S., Biot (FR)

(72) Inventors: Mourad Boudia, Biot (FR); Herve Prezet, Biot (FR); Massimiliano Maini, Biot (FR); Rodolphe Texier, Biot (FR)

(73) Assignee: Amadeus S.A.S., Biot (FR)

( * ) Notice: Subject to any disclaimer, the term of this patent is extended or adjusted under 35 U.S.C. 154(b) by 0 days.

(21) Appl. No.: 18/784,003

(22) Filed: Jul. 25, 2024

(65) Prior Publication Data

US 2025/0061158 A1 Feb. 20, 2025

(30) Foreign Application Priority Data

Aug. 17, 2023 (EP) ..................................... 23315320

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 16/9537* (2019.01); *G06N 20/00* (2019.01)

(58) Field of Classification Search
CPC .... G06F 9/451; G06F 9/44526; G06F 16/436; G06F 16/9537; G06F 16/9535; G06N 20/00
See application file for complete search history.

(56) References Cited

U.S. PATENT DOCUMENTS

2022/0277036 A1* 9/2022 Dhiman ................ G06F 16/436
2023/0014995 A1* 1/2023 Sharma .............. H04N 21/4415
(Continued)

OTHER PUBLICATIONS

Hauck, Rainer, Examiner, Extended European Search Report, mailed Feb. 13, 2024, issued in the corresponding European Patent Application No. 23315320.4, filed Aug. 17, 2023.
(Continued)

*Primary Examiner* — Yicun Wu
(74) *Attorney, Agent, or Firm* — PERRY + CURRIER INC.

(57) ABSTRACT

A device, system and method for secure assistive handling of electronic content is provided. A computing device trains one or more machine learning engines using account profile(s) as training data, the account profile(s) indicative of previous content selected or accessed in association with the account profile(s). After training the machine learning engine(s), the computing device receives, via one or more of a communication interface and a human-machine interface, criteria for selecting content, and searches for content that meets the criteria, using one or more of the communication interface, the machine learning engine(s), and the human-machine interface. The computing device receives, via one or more of the communication interface and the human-machine interface, the content that meets the criteria, and filters, via the machine learning engine(s), the content to generate filtered content according to the account profile(s). The computing device controls an output device to output the filtered content.

22 Claims, 8 Drawing Sheets

(51) Int. Cl.
G06F 16/9537 (2019.01)
G06N 20/00 (2019.01)

(56) References Cited

U.S. PATENT DOCUMENTS

2024/0241734 A1\* 7/2024 Kandel .................. G06F 9/451
2024/0419464 A1\* 12/2024 Chen ...................... G06F 9/453

OTHER PUBLICATIONS

Gupta Varun, et al.,: "Filtering Search Results using Explicit Feed-back", Proceedings of the International Conference on Data Mining (DMIN), 2012, pp. 108, XP093123216, Athens.
Chidlovskii B., et al.,: Collaborative Re-reanking of Search Results, Internet Citation, Jul. 30, 2000, XP002250910, Retrieved from the Internet: URL:http://www.xrce.xerox.com/Publications/Attachments/2000-017/AAAI-WS00-CollRanking.pdf.

\* cited by examiner

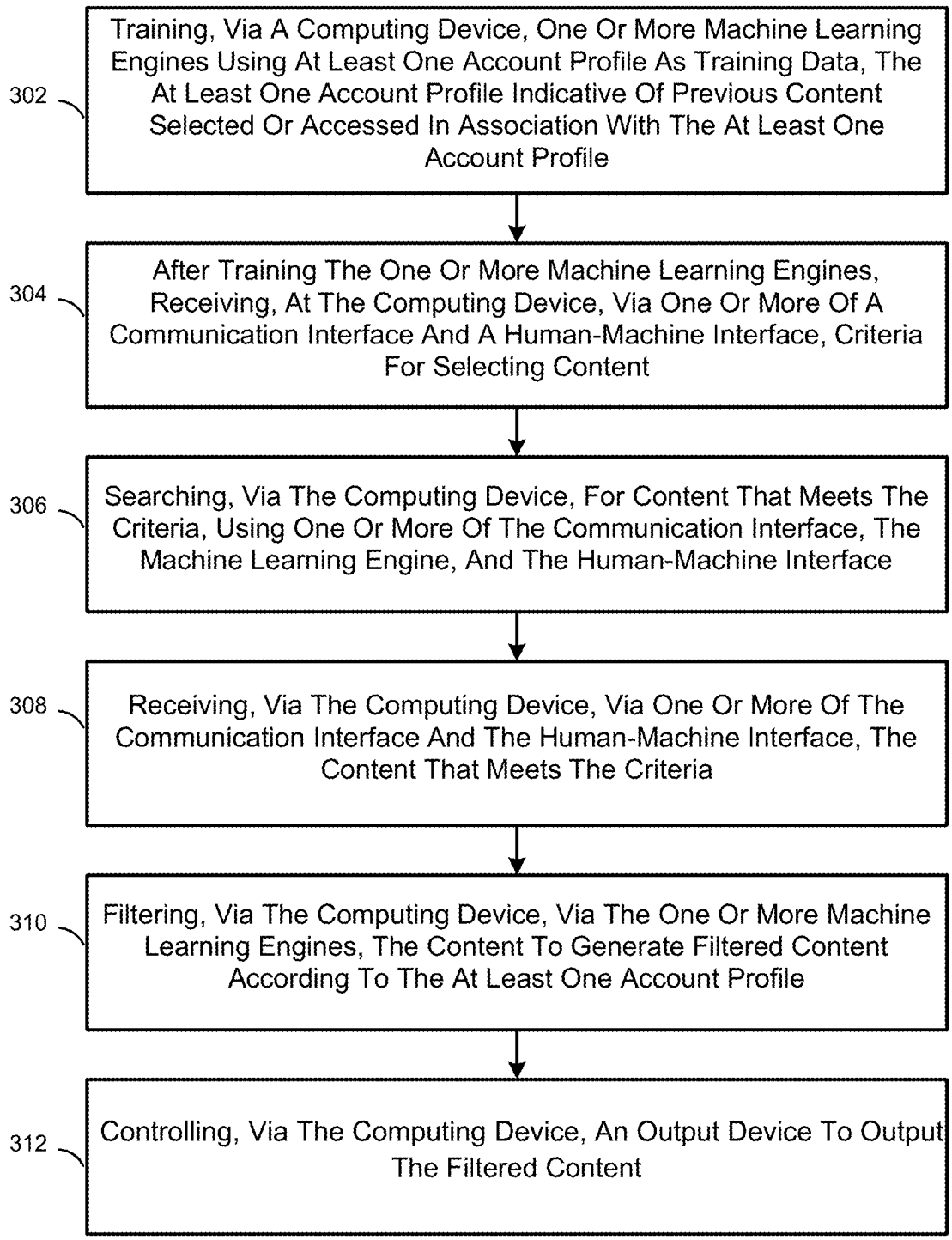

302 — Training, Via A Computing Device, One Or More Machine Learning Engines Using At Least One Account Profile As Training Data, The At Least One Account Profile Indicative Of Previous Content Selected Or Accessed In Association With The At Least One Account Profile 304 — After Training The One Or More Machine Learning Engines, Receiving, At The Computing Device, Via One Or More Of A Communication Interface And A Human-Machine Interface, Criteria For Selecting Content 306 — Searching, Via The Computing Device, For Content That Meets The Criteria, Using One Or More Of The Communication Interface, The Machine Learning Engine, And The Human-Machine Interface 308 — Receiving, Via The Computing Device, Via One Or More Of The Communication Interface And The Human-Machine Interface, The Content That Meets The Criteria 310 — Filtering, Via The Computing Device, Via The One Or More Machine Learning Engines, The Content To Generate Filtered Content According To The At Least One Account Profile 312 — Controlling, Via The Computing Device, An Output Device To Output The Filtered Content

DEVICE, SYSTEM, AND METHOD FOR SECURE ASSISTIVE HANDLING OF ELECTRONIC CONTENT

FIELD

The present specification relates generally to assistive devices for disabilities, and specifically to a device, system and method for secure assistive handling of electronic content.

BACKGROUND

Users with disabilities may interact with electronic locations or physical locations, such as websites, augmented reality platforms, virtual reality platforms, shops, and the like, for example to interact with content. However, they may prefer to do so without disclosing their disability to the electronic locations, as this may lead to privacy breaches. Similarly, interacting with electronic locations and/or digital locations, and/or physical locations may be challenging, depending on the disability.

SUMMARY

A first aspect of the present specification provides a method comprising: training, via a computing device, one or more machine learning engines using at least one account profile as training data, the at least one account profile indicative of previous content selected or accessed in association with the at least one account profile; after training the one or more machine learning engines, receiving, at the computing device, via one or more of a communication interface and a human-machine interface, criteria for selecting content; searching, via the computing device, for content that meets the criteria, using one or more of the communication interface, the one or more machine learning engines, and the human-machine interface; receiving, via the computing device, via one or more of the communication interface and the human-machine interface, the content that meets the criteria; filtering, via the computing device, via the one or more machine learning engines, the content to generate filtered content according to the at least one account profile; and controlling, via the computing device, an output device to output the filtered content.

The method of the first aspect may further comprise, prior to training the one or more machine learning engines using the at least one account profile as the training data: training the one or more machine learning engines using one or more of a generic profile and demographic data.

The method of the first aspect may further comprise, prior to searching for the content that meets the criteria: determining one or more electronic locations or one or more physical locations to perform the searching.

The method of the first aspect may further comprise: selecting, via the one or more machine learning engines, an asset associated with the filtered content; and requesting, via one or more of the communication interface, the human-machine interface, and the one or more machine learning engines, the asset.

The method of the first aspect may further comprise: receiving, via an input device, a selection of an asset represented by the filtered content output to the output device; and requesting, via one or more of the communication interface, the human-machine interface, and the one or more machine learning engines, the asset.

The method of the first aspect may further comprise: receiving, via an input device, a selection from the filtered content output to the output device, the selection being of an asset represented by the filtered content; and again training the one or more machine learning engines using one or more of the criteria and the content as training input and the selection as training output.

At the method of the first aspect, the at least one account profile may be associated with a single user.

At the method of the first aspect, the at least one account profile may be associated with two or more users.

The method of the first aspect may further comprise: searching, via one or more of the communication interface, the human-machine interface, and the one or more machine learning engines, for the content that meets the criteria by interfacing with one or more of at least one content platform and at least one human.

A second aspect of the present specification provides a computing device comprising: a controller; and a computer-readable storage medium having stored thereon program instructions that, when executed by the controller, causes the controller to perform a set of operations comprising: training one or more machine learning engines using at least one account profile as training data, the at least one account profile indicative of previous content selected or accessed in association with the at least one account profile; after training the one or more machine learning engines, receiving, via one or more of a communication interface and a human-machine interface, criteria for selecting content; searching for content that meets the criteria, using one or more of the communication interface, the one or more machine learning engines, and the human-machine interface; receiving, via one or more of the communication interface and the human-machine interface, the content that meets the criteria; filtering, via the one or more machine learning engines, the content to generate filtered content according to the at least one account profile; and controlling, via the computing device, an output device to output the filtered content.

At the computing device of the second aspect, the set of operations may further comprise: prior to training the one or more machine learning engines using the at least one account profile as the training data: training the one or more machine learning engines using one or more of a generic profile and demographic data.

At the computing device of the second aspect, the set of operations may further comprise, prior to searching for the content that meets the criteria: determining one or more electronic locations or one or more physical locations to perform the searching.

At the computing device of the second aspect, the set of operations may further comprise: selecting, via the one or more machine learning engines, an asset associated with the filtered content; and requesting, via one or more of the communication interface, the human-machine interface, and the one or more machine learning engines, the asset.

At the computing device of the second aspect, the set of operations may further comprise: receiving, via an input device, a selection of an asset represented by the filtered content output to the output device; and requesting, via one or more of the communication interface, the human-machine interface, and the one or more machine learning engines, the asset.

At the computing device of the second aspect, the set of operations may further comprise: receiving, via an input device, a selection from the filtered content output to the output device, the selection being of an asset represented by the filtered content; and again training the one or more machine learning engines using one or more of the criteria and the content as training input and the selection as training output.

At the computing device of the second aspect, the at least one account profile may be associated with a single user.

At the computing device of the second aspect, the at least one account profile is associated with two or more users.

At the computing device of the second aspect, the set of operations may further comprise: searching, via one or more of the communication interface, the human-machine interface, and the one or more machine learning engines, for the content that meets the criteria by interfacing with one or more of at least one content platform and at least one human.

A third aspect of the present specification provides a non-transitory computer-readable storage medium having stored thereon program instructions that, when executed by a computing devices, causes the computing device to perform a method comprising: training one or more machine learning engines using at least one account profile as training data, the at least one account profile indicative of previous content selected or accessed in association with the at least one account profile; after training the one or more machine learning engines, receiving, via one or more of a communication interface and a human-machine interface, criteria for selecting content; searching for content that meets the criteria, using one or more of the communication interface, the one or more machine learning engines, and the human-machine interface; receiving, via one or more of the communication interface and the human-machine interface, the content that meets the criteria; filtering, via the one or more machine learning engines, the content to generate filtered content according to the at least one account profile; and controlling an output device to output the filtered content.

The method of the third aspect may further comprise, prior to training the one or more machine learning engines using the at least one account profile as the training data: training the one or more machine learning engines one or more of a generic profile and demographic data.

The method of the third aspect may further comprise, prior to searching for the content that meets the criteria: determining one or more electronic locations or one or more physical locations to perform the searching.

The method of the third aspect may further comprise: selecting, via the one or more machine learning engines, an asset associated with the filtered content; and requesting, via one or more of the communication interface, the human-machine interface, and the one or more machine learning engines, the asset.

The method of the third aspect may further comprise: receiving, via an input device, a selection of an asset represented by the filtered content output to the output device; and requesting, via one or more of the communication interface, the human-machine interface, and the one or more machine learning engines, the asset.

The method of the third aspect may further comprise: receiving, via an input device, a selection from the filtered content output to the output device, the selection being of an asset represented by the filtered content; and again training the one or more machine learning engines using one or more of the criteria and the content as training input and the selection as training output.

At the method of the third aspect, the at least one account profile may be associated with a single user.

At the method of the third aspect, the at least one account profile may be associated with two or more users.

The method of the third aspect may further comprise: searching, via one or more of the communication interface, the human-machine interface, and the one or more machine learning engines, for the content that meets the criteria by interfacing with one or more of at least one content platform and at least one human.

BRIEF DESCRIPTIONS OF THE DRAWINGS

For a better understanding of the various examples described herein and to show more clearly how they may be carried into effect, reference will now be made, by way of example only, to the accompanying drawings in which:

FIG. 3 depicts a flowchart of a method for secure assistive handling of electronic content, according to non-limiting examples.

DETAILED DESCRIPTION

Users with disabilities may interact with electronic locations, and/or digital locations, or physical locations, such as websites, augmented reality platforms, virtual reality platforms, shops, and the like, for example to interact with content. However, they may want to interact and/or handle content without exposing their disability, which may lead to their disability being identified and shared. Put another way, the users may wish to interact and/or handle content without exposing personal identifiable information, and the like. As such, provided herein is a device, system and method for secure assistive handling of electronic content.

Figure 1:
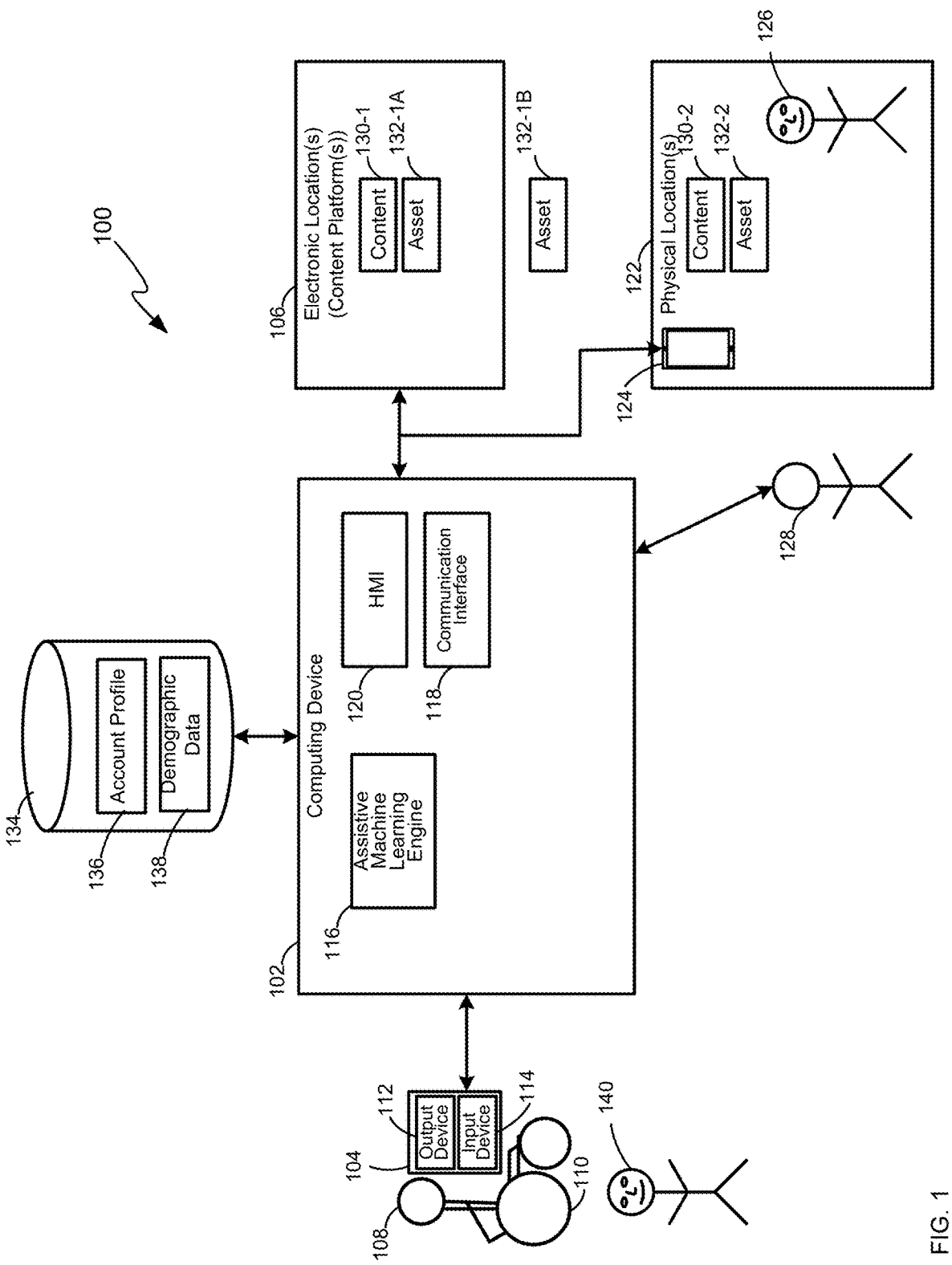
FIG. 1 depicts a system for secure assistive handling of electronic content, according to non-limiting examples.

FIG. 1 shows a system 100 for secure assistive handling of electronic content.

The system 100 will be described with respect to engines. As used herein, the term "engine" refers to hardware (e.g., a processor, such as a central processing unit (CPU), graphics processing unit (GPU), an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), a PAL (programmable array logic), a PLA (programmable logic array), a PLD (programmable logic device), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

Furthermore, the components of the system 100 are generally in communication via communication links, which are depicted in FIG. 1, and throughout the present specification, as double-ended arrows between respective components. The communication links include any suitable combination of wireless and/or wired communication networks and, similarly, the communication links may include any suitable combination of wireless and/or wired links.

As depicted, the system 100 comprises a computing device 102 in communication with a client device 104 and one or more electronic locations 106. For simplicity, the one or more electronic locations 106 are interchangeable referred to hereafter as the electronic location 106 and/or the electronic locations 106. It is understood that, as depicted, an electronic location 106 further may generally comprise a content platform for providing content as described herein. Furthermore, the electronic locations 106 may be interchangeably referred to as digital locations, and the like. Furthermore, when an electronic location 106 comprises a virtual reality platform, as described herein, such an electronic location 106 may comprise a virtual location.

Furthermore, as depicted, the client device 104 is understood to be associated with, and/or operated by, a user 108, who may be disabled. For example, as depicted, the user 108 may use an assistive device 110, such as a wheelchair (e.g., as depicted). However, it is understood that that the assistive device 110 may be optional. Furthermore, it is understood that a disability of the user 108 may not be visible. Rather, a disability of the user 108 may include, but is not limited to, inability to walk and/or stand, color blindness, vision loss, vision and/or light sensitivity, hearing loss, hearing and/or noise sensitivity, post-traumatic stress disorder (PTSD), depression, anxiety, amongst other possibilities, and/or combinations thereof.

The client device 104 may comprise any suitable type of client device for interacting with the computing device 102 and/or the electronic location 106. The client device 104 may include, but is not limited to, a headset, a virtual reality suit, a laptop computer, a desktop computer, a mobile phone, a tablet computer and any other device that may be used to receive content from the electronic location 106, or content associated with other locations as described herein, that complement the input and output hardware devices associated with the client device 104. It is contemplated that the client device 104 may include virtual or augmented reality gear complementary to virtual environments (e.g., virtual reality and/or augmented reality environments) that may be offered by the electronic location 106, and/or any other suitable electronic location. In particular, as depicted, the client device 104 may comprise an output device 112 and input device 114. The output device 112 may comprise one or more of a display screen, a speaker, and the like, and/or any other suitable output devices in accordance with a type of the client device 104. The input device 114 may comprise one or more of a keyboard, a pointing device, a touch screen, a virtual reality and/or augments reality input device, and/or any other suitable input devices in accordance with a type of the client device 104.

Furthermore, it is understood that a disability of the user 108 may cause the user 108 to interact with the client device 104 in a manner that may indicate the disability of the user 108. For example, in situations where the user 108 may operate the input device 114 of the client device 104 to interact with the electronic location 106, computing resources at the electronic location 106 may detect, via receipt of input from the input device 114, the disability, for example based on times between receiving sets of input, and the like, from the input device 114.

A further security issue may be that the disability of the user 108 may make it challenging for the user 108 to mitigate any security problems with the electronic location 106. For example, the electronic location 106 may comprise code, and the like, to interact with the client device 104 to detect any personal identifiable information (PII), and the like, of the user 108 stored at the client device 104. Alternatively, and/or in addition, such code may rely on the user 108 providing permission via the input device 114 and/or clicking electronic buttons provided by the electronic location 106, and the like, and the disability of the user 108 may make it challenging for the user 108 to determine when providing such permissions may lead to the client device 104 detecting PII, and the like.

Hence, as depicted, the computing device 102 comprises an assistive machine learning engine 116 generally configured to assist the client device 104 with interacting with the electronic location 106, as described herein. For simplicity, the assistive machine learning engine 116 is interchangeably referred to hereafter as the machine learning engine 116.

In particular, the computing device 102 further comprises a communication interface 118 via which the machine learning engine 116 may interact with the electronic location 106.

Alternatively, or in addition, the computing device 102 further comprises a human-machine interface (HMI) 120 via which the machine learning engine 116 may alternatively interact with the electronic location 106, or other types of locations.

For example, as depicted, the system 100 may further comprise one or more physical locations 122, such as shops, and the like, associated with a respective communication device 124, for example, as depicted, a mobile communication device and/or phone, however the communication device 124 may comprise any suitable communication device 124 including, but not limited to, a mobile communication device, a telephone, a desk phone, a laptop and/or a personal computer operating a communication application, and the like. For simplicity, the one or more physical locations 122 are interchangeable referred to hereafter as the physical location 122 and/or the physical locations 122. In some examples, as described with respect to FIG. 7, the communication device 124 may be optional.

As depicted, the physical location 122 is staffed by, and/or is associated with, a respective human user 126 who may operate the communication device 124 to receive and/or make calls. When the system 100 comprises a plurality of physical locations 122, a physical location 122 may be staffed by a respective human user 126, though a physical location 122 may alternatively comprise any suitable combination of computing devices and/or automated devices to electronically "staff" a physical location; for example a given physical location 122 may comprise vending machines of varying degrees of electronic sophistication, and which may have a communication device 124 at least partially integrated therewith.

Returning to the physical location 122 staffed by the human user 126 and the communication device 124, the machine learning engine 116 may interact with the HMI 120 to make a call to the communication device 124, for example via the communication interface 118, which may be answered by the human user 126. As such, the HMI 120 may comprise a text-to-speech engine, a speech-to-text engine, a natural language engine, and the like, such that the HMI 120 may convert text and/or natural language generated by the natural language engine, to speech to "speak" to the human user 126, receive spoken (e.g., speech) answers from the human user 126, which may be converted to text, and the like for processing, etc. In this manner, the machine learning engine 116 may interact with the human user 126, for example to conduct a conversation with the human user 126.

Alternatively, and/or in addition, the computing device 102 may operate a mobile HMI 128, which may comprise a robot, an android, a drone, and the like, configured to move and/or navigate a physical environment, including, but not limited to, the physical location 122. In these examples, the computing device 102 and/or the machine learning engine 116 may communicate with, and/or control, the mobile HMI 128 via a communication link, for example implemented at least in part via the communication interface 118. In some examples, as described with respect to FIG. 7, the communication device 124 may be optional.

For example, the mobile HMI 128 may enter the physical location 122 and interact with the human user 126, or any automated devices, for example to visually and/or aurally scan the store for content and/or interact, and/or conduct a conversation, with the human user 126, and/or any automated devices via any suitable combination of input and output devices, including, but limited to, a microphone and a speaker, and the like. In some examples, the mobile HMI 128 may comprise components similar to the HMI 120; alternatively, or in addition, the computing device 102 may control the speech functionality of the mobile HMI 128 via the communication link therebetween.

A further security issue may be that, should the user 108 call the communication device 124, for example using the client device 104, the disability of the user 108 may be such that the disability of the user 108 may be apparent to the human user 126 on the call, and/or a phone number, and the like, of the client device 104 may be used by the human user 126 to determine a location of the user 108 (e.g., via a web search to find a publicly available geographic address associated with a phone number of the client device 104), and the like. When the human user 126 is a bad actor, and the like, the human user 126 may use the address and/or the disability of the user 108 in a manner to harm, defraud, and/or otherwise act in a manner that may negatively impact the user 108; in a particular example, the human user 126 may sell information about the user 108, that the human user 126 has determined to another bad actor who may act in a manner negatively impacts the user 108.

The computing device 102 may hence act as a proxy on behalf of the client device 104, for example to assist the client device 104, and/or the user 108, by accessing the electronic location 106 and/or the physical location 122 on behalf of the client device 104, and/or the computing device 102 may control aspects of the electronic location 106 and/or the physical location 122 on behalf of the client device 104. As such, the computing device 102 is understood to comprise a proxy device, and may be interchangeably referred to hereafter as the proxy device 102.

While only one client device 104 is depicted, it understood that the system 100 may comprise a plurality of client devices that may engage in communication sessions with the electronic location(s) 106, and the computing device 102 may comprise a proxy device that controls respective aspects of the electronic location(s) 106 on behalf of the plurality of client devices, including, but not limited to, the client device 104.

Returning to the electronic location 106, the electronic location 106 may be based on any present or future electronic media servers that publish and/or provide content for the client device 104 including, but not limited to, web pages, social media, audio, video, movies, television, games, books, news, search results, ecommerce content, and the like, for example in web page format, a metaverse format and/or any other suitable format. In particular, the electronic location 106 may comprise augmented reality and/or virtual reality platforms which may provide augmented reality and/or virtual reality environments, such as "metaverse" environments.

The electronic location 106 may comprise a publisher platform that publishes content, and the like, and may comprise any suitable combination of any suitable number of servers, cloud computing platforms, and the like.

As depicted, the electronic location 106 and the physical location 122 may provide respective content 130-1, 130-2 (interchangeably referred to hereafter, collectively and/or generically as the content 130, a convention that will be used throughout the present specification). In particular, the content 130-1 may be associated with respective assets 132-1A, 132-1B, where an asset 132-1A comprises an electronic asset, and an asset 132-1B comprises a physical asset. For example, an electronic asset 132-1A may comprise an asset that may be provided and/or delivered electronically, such as audio, video, movies, television, games, electronic books, an electronic subscription and/or service, a travel booking (e.g., an airline ticket, a train ticket, a bus ticket, a hotel reservation, etc.), virtual goods, virtual services, and the like, amongst other possibilities.

While the electronic asset 132-1A is depicted as being a component of the electronic location 106, the electronic asset 132-1A may be stored and/or generated and/or provided by a server, and the like, that is different from the electronic location 106. Put another way, the content 130-1 may describe the electronic asset 132-1A, but the electronic asset 132-1A may be stored and/or generated and/or provided by a different server, and the like.

In contrast, a physical asset 132-1B may comprise an asset that may be provided and/or delivered physically, such as food, furniture, physical books, household items, computers, electronic goods, consumer goods, commercial goods, and the like, amongst other possibilities. As such, in FIG. 1, the physical asset 132-1B is depicted as external to the electronic location 106 as the physical asset 132-1B is not in an electronic format and may be physically housed in a warehouse, and the like.

For simplicity, the assets 132-1A, 132-1B are interchangeably referred to hereafter, collectively, as the assets 132-1, and, generically, as an asset 132-1.

Hence, in general, the electronic location 106 may be "browsed" to access the content 130-1 in any suitable manner, for example by accessing web pages via links, and the like, and/or via browsing in a metaverse environment (e.g., via an avatar) to perform searches, and the like, review the content 130-1, and the like, and/or to request one or more assets 132-1, which may be electronically or physically provided, depending on a nature of an asset 132-1. Indeed, in some examples, the HMI 120 may alternatively be used to browse content 130-1 of the electronic location 106, for example by way of providing and receiving speech in a metaverse environment.

Furthermore, an electronic asset 132-1A may be electronically provided to the client device 104, and/or another client device associated with the user 108 (e.g., via any suitable messaging application, and the like), and a physical asset 132-1B may be physically provided (e.g., shipped) to a physical location associated with the user 108 and/or the client device 104.

Similarly, the physical location 122 may comprise content 130-2 associated with one or more respective assets 132-2, and may include, but is not limited to, physical or electronic descriptions of the assets 132-2, which may comprise physical or electronic assets 132-2 available via the physical location 122. In some examples, a set of content 130-2 and a respective asset 132-2 may be combined, however such content 130-2 may be electronically represented in any suitable format. In some examples, content 130-2 may be in the form of an RFID (radio frequency identifier) tag, and/or NFC (near field communication) tag, and the like, storing information describing a respective asset 132-2, and which may be queried by a suitable RFID and/or NFC tag reader of the mobile HMI 128.

For simplicity, the content 130-1, 130-2 is interchangeably referred to hereafter, collectively, as the content 130, and, generically as a set of content 130, and the like. Similarly, the assets 132-1A, 132-1B, 132-2 is interchangeably referred to hereafter, collectively, as the assets 132, and, generically as an asset 132, and the like.

In some examples, the content 130-1 of the electronic location 106 may describe assets 132-2 of the physical location 122, and/or vice versa (e.g., the content 130-2 of the physical location 122 may describe assets 132-1 of the electronic location 106), and the like.

As has been mentioned, the client device 104 may be used to access the content 130-1, and/or, when the client device 104 comprises a communication device, the client device 104 may be used to call the communication device 124.

However, as has already been discussed, interactions between the client device 104 and the locations 106, 122 may be insecure, and the like.

As will be described herein, the computing device 102 may be in communication with a memory 134 (e.g., which may be in the form of a database, and the like), storing at least one account profile 136 associated with the user 108 and/or the client device 104. Alternatively, and/or in addition, the at least one account profile 136 may be stored at the client device 104 and provided to the computing device 102 by the client device 104. Regardless, the at least one account profile 136 is understood to be available to the computing device 102. For simplicity, the at least one account profile 136 is interchangeably referred to hereafter as the account profile 136.

The account profile 136 generally stores information associated with the user 108, including, but not limited to, historical information indicative of previous selections of the user 108 of content and/or assets provided by one or more of the locations 106, 122, and/or any other suitable locations, and the like. Alternatively, and/or in addition, the account profile 136 may store indications of interactions with content and/or assets provided by one or more of the locations 106, 122 (e.g., such as viewing of content and/or assets without such content and/or assets being specifically selected; in a specific examples, such interactions may include, but are not limited to, a web-page and the like, showing and/or associated with certain content being browsed, including, but not limited to, reviews of such content). The account profile 136 may hence store previous browsing and/or searches of one or more of the locations 106, 122 by the client device 104, as well as selections from such previous browsing and/or searches, and/or another client device associated with the user 108, preferences associated with the user 108, and the like. Such browsing and/or searching and/or selections stored at the account profile 136 may include, but are not limited to, social media posts, indications of purchases at ecommerce platforms, a browser history, and the like. The account profile 136 may be historically populated by the client device 104, and/or another client device, for example by way of the user 108 interacting with the client device 104, and/or another client device, and the like. Regardless, the account profile 136 may represent information that may be used to train the machine learning engine 116 as described herein.

The account profile 136 may store other data associated with the user 108, including, but not limited to, demographic data (e.g., such as an age, an indication of the disability, and the like), payment information (e.g., credit card information), account information and/or loyalty numbers for electronic locations 106, and the like, shipping information (e.g., such as a network address and/or geographic address of the user 108), amongst other possibilities. The account profile 136 may further comprise log-in credentials (e.g., a username and password, and the like), for example for logging into the electronic location 106, and/or other electronic locations.

Alternatively, and/or in addition, the memory 134 may further store a generic profile 138 which may also represent information that may be used to train the machine learning engine 116 as described herein. For example, the generic profile 138 may represent browsing and/or searches of one or more of the locations 106, 122, as well as selections from such previous browsing and/or searches, by other users (not depicted) that may be of a same and/or similar demographic as the user 108 (e.g., users of a same and/or similar age, and/or having a same and/or similar disability and the like). Put another way, the generic profile 138 may represent preferences associated with users that may be of a same and/or similar demographic as the user 108. The generic profile 138 may be historically populated via the computing device 102 interacting with client devices associated with the other users, and the like, and/or the generic profile 138 may be populated by other devices in the system 100 and stored at the memory 134. In some examples, the generic profile 138 may comprise a plurality of account profiles associated with other users that may be of a same and/or similar demographic as the user 108. Hence, the generic profile 138 may represent generic preferences for users that may be of a same and/or similar demographic as the user 108. Alternatively, or in addition, the generic profile 138 may be populated from a plurality of account profiles associated with other users that may be of a same and/or similar demographic as the user 108. Hence, the generic profile 138 may represent generic preferences for users that may be of a same and/or similar demographic as the user 108.

In some examples, the account profile 136 may be associated a single user 108.

However, in other examples, the account profile 136 is associated with two or more users, such as the user 108 and an associated user 140, who may be a spouse and/or child and/or relative and/or friend of the user 108. It is assumed in these examples that the user 140 may not have the disability of the user 108.

Using the users 108, 140 as an example, the account profile 136 may comprise respective account profiles associated with the users 108, 140, and/or the account profile 136 may comprise a combined account profile associated with the users 108, 140. In the latter example, respective account profiles associated with the users 108, 140 may be combined into a single account profile and/or the users 108, 140 may share the client device 104 and/or the users 108, 140 may operate other devices, and activity from the client device 104 and/or the other devices may be stored at the account profile 136. When the account profile 136 comprises respective account profiles associated with the users 108, 140, it is understood that both respective account profiles may be associated with both the users 108, 140.

In general, when the account profile 136 is associated with two or more users, the account profile 136 may represent combined preferences of the two or more users, such as the users 108, 140. For example, the account profile 136 may represent preferences of the users 108, 140 when the users 108, 140 are making decisions about selecting content 130 and/or assets 132 together.

Using a travel industry example, when the user 108 travels alone, the user 108 may select content 130 at the electronic location 106 that represent bookings of hotels, and the like, where the user 108 may get assistance with their disability. However, when the user 108 travels with the user 140, the users 108, 140 may select content 130 at the electronic location 106 that represent bookings of hotels, and the like, where the user 108 may not get assistance with their disability, as the user 140 may provide such assistance to the user 108. Alternatively, or in addition, the user 108 may select content 130 at the electronic location 106 on behalf of the user 140 (e.g., as a proxy for the user 140), and/or the user 140 may select content 130 at the electronic location 106 on behalf of the user 130 (e.g., as a proxy for the user 108. Hence, when the account profile 136 is associated with the single user 108, the account profile 136 may represent preferences of the user 108 when travelling alone; and when the account profile 136 is associated with the users 108, 140, the account profile 136 may represent preferences of the users 108, 140 when travelling together.

Similarly, the generic profile 138 may represent preferences of users of a same and/or similar demographic as the user 108, such as a same and/or similar disability as the user 108. Similarly, the generic profile 138 may represent preferences of users of a same and/or similar demographic as the user 108, such as a same and/or similar disability as the user 108 when travelling with someone without a disability. However, any suitable generic profile 138 is within the scope of the present specification.

Regardless, the account profile 136 and/or the generic profile 138 may be used to train the machine learning engine 116 to search for, and filter, content 130 at one or more of the locations 106, 122 as a proxy for the client device 104. In some examples, a first machine learning engine 116 (e.g., such as a first layer of a neural network of the machine learning engine 116) may be trained to search for content 130 using search criteria (e.g., received from the client device 104), while a second machine learning engine 116 (e.g., such as a second layer of a neural network of the machine learning engine 116) may be trained to filter content 130 based on the account profile 136.

In some examples, however, the machine learning engine 116 may be trained to filter content 130, but not search for content 130. Rather, in these examples, a programmatic application may be used to search for content 130 (e.g., that meets search criteria received from the client device 104), which is filtered by the machine learning engine 116 for example according to preferences indicated by the account profile 136 and/or the generic profile 138.

In other examples, however, the machine learning engine 116 may be trained to select locations 106, 122 to search, and filter content 130, but not explicitly search for content 130. Rather, in these examples, the machine learning engine 116 may be trained to select locations to search based on the criteria received from the client device 104 and/or according to preferences indicated by the account profile 136 and/or the generic profile 138. The aforementioned programmatic application may be used to search for content 130 which is filtered by the machine learning engine 116.

Hence, presuming the machine learning engine 116 is trained, the user 108 may operate the input device 114 of the client device 104 to enter criteria (e.g., search criteria) for searching the content 130, and provide the criteria to the computing device 102.

The computing device 102 may search the content 130 via the communication interface 118, and the machine learning engine 116 and/or via one or more of the HMIs 120, 128, to acquire content 130 and/or copies thereof, and/or indications thereof at the computing device 102. The machine learning engine 116 may be used to filter the content 130 (e.g., as received and/or as represented by the copies and/or the indications) according to the account profile 136, and control the output device 112 to output the filtered content.

The user 108 may operate the client device 104 to select an asset 132 from the filtered content to, for example, acquire the asset 132, and such a data exchange may also occur by way of the computing device 102. Indeed, any required payment for acquiring a selected asset 132 may occur securely, for example via a third-party payment server, and the like, to better secure PII related to payments from the locations 106, 122.

In this manner, the computing device 102 may enable secure assistive access to the locations 106, 122 without compromising PII of the user 108. Furthermore, the aforementioned searching and filtering of content 130 may occur in a manner that is more efficient for the user 108, for example when their disability impedes their ability to search for and/or filter content 130.

Figure 2:
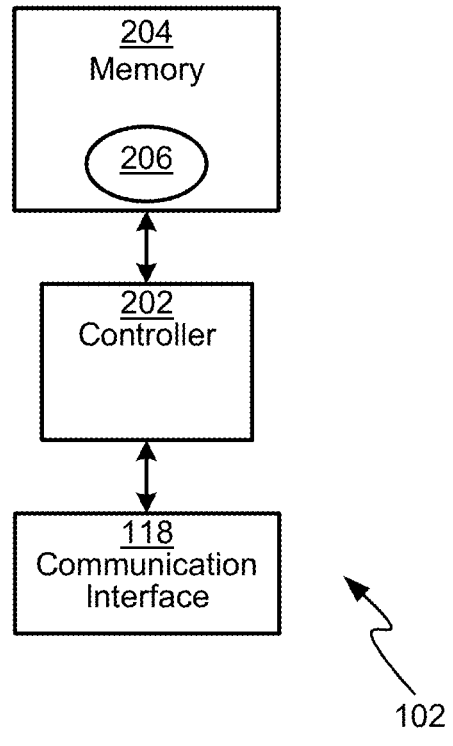
FIG. 2 depicts a block diagram of a device for secure assistive handling of electronic content, according to non-limiting examples.

Attention is next directed to FIG. 2, which depicts details of the computing device 102. The computing device 102 may comprise one or more computing devices, and/or one or more servers and/or one or more cloud computing devices, and the like. Alternatively, and/or in addition, the computing device 102 may comprise one or more personal computers and/or one or more laptops, and/or any other suitable computing device.

In the depicted example of FIG. 2, the computing device 102 includes at least one controller 202 interconnected with a memory 204, storing one or more applications 206, and a communication interface 118.

The controller 202 may be implemented as a plurality of processors or one or more multi-core processors and/or may include one or more central processing units (CPUs). However, the controller 202 may comprise any suitable combination of processors, ASICS, FPGAS, PALs, PLAS, PLDs, and the like. The controller 202 be configured to execute different programing instructions, as described herein.

The memory 204 may include any suitable combination of non-volatile and volatile memories. A non-volatile memory, of the memory 204, may be based on any persistent memory technology, such as an Erasable Electronic Programmable Read Only Memory ("EEPROM"), flash memory, solid-state hard disk (SSD), other type of hard-disk, or combinations of them. Hence, a non-volatile memory, of the memory 204, may also be described as a non-transitory computer readable media.

A volatile memory, of the memory 204, may be based on any random access memory (RAM) technology. For example, volatile memory, of the memory 204, may be based on a Double Data Rate (DDR) Synchronous Dynamic Random-Access Memory (SDRAM).

Other types of non-volatile and/or volatile memory are contemplated and/or may be provided.

The controller 202 and the memory 204 may be generally comprised of one or more integrated circuits (ICs).

The controller 202 is also interconnected with the communication interface 118, which enables the computing device 102 to communicate with the other components of the system 100, for example via any suitable network. The communication interface 118 therefore may include any suitable components (e.g., network interface controllers (NICs), radio units, and the like) to communicate via any suitable network. The specific components of the communication interface 118 may be selected based upon the nature of a network used to communicate, and/or local communication between components of the system 100, and the like.

While not depicted in FIG. 2, the computing device 102 may also include input and output devices connected to the controller 202, such as keyboards, mice, display screens, and the like (not shown).

The components of the computing device 102 may be deployed in a single enclosure, or in a distributed format. In some examples, therefore, the computing device 102 may include a plurality of controllers and/or processors, either sharing the memory 204 and the communication interface 118, or having distinct associated memories and communication interfaces. As such, it is understood that the memory 204 and/or a portion of the memory 204 may be internal (e.g., as depicted) or external to the computing device 102; regardless, the controller 202 is understood to have access to the memory 204. In some examples, the memory 204 may comprise the memory 134 and/or a portion of the memory 134, and hence the memory 204 may store one or more of the account profile 136 and the generic profile 138.

The memory 204 also stores computer-readable programming instructions, executable by the controller 202, in the form of various applications, including the application 206. As will be understood by those skilled in the art, the controller 202 executes the instructions of the application 206 (and any other suitable applications) in order to perform various actions defined by the instructions contained therein including, but not limited to, the blocks of a method described with respect to FIG. 3. In the description below, the controller 202, and more generally the computing device 102, are understood to be configured to perform those actions. It will be understood that they are so configured via the execution (by the controller 202) of the instructions of the applications stored in memory 204.

Furthermore, the application 206 may include any suitable modules and/or components for implementing the engine 116 and/or the HMI 120 and/or for controlling the mobile HMI 128. Furthermore, such modules and/or components may comprise any suitable combination of programmatic algorithms and/or machine learning algorithms. However, functionality of any of the engine 116, the HMI 120, and the mobile HMI 128 may be combined in any suitable manner, and in some examples, one or more of the engine 116, the HMI 120, and the mobile HMI 128 may be omitted; rather, functionality of one or more of the engine 116, the HMI 120, and the mobile HMI 128 may be implemented by the application 206.

When such modules and/or components include machine learning algorithms, it is understood that the machine learning algorithms may be operated in a training mode to train the machine learning algorithms to perform functionality as described herein. In particular, the machine learning algorithms may be operated according to a machine learning training feedback loop in which previous input and previous output are used as training data labelled with a score, and the like, indicating accuracy and/or adequacy, and the like of the previous output. Such a score may be generated by the client device 104, and provided to the computing device 102, and may represent a score assigned to the output by the user 108. For example, the user 108 may score filtered content, and such a score may be used to train the machine learning engine 116 to better filter content. However, a selection of the filtered content, and/or interactions with the filtered content, (e.g., that occurs by the user 108 operating the client device 104) may be assigned a score (e.g., such as "1", on a scale of 0 to 1, where "0" indicates low accuracy and "1" indicates high accuracy) that indicates high accuracy and/or adequacy, and the like of the content from which the filtered content was generated, and the selection and/or interactions, along with the content (e.g., and/or the criteria that resulted in the content) may be used to train the machine learning algorithms in a training mode.

The infrastructure of the computing device 102, or a variant thereon, can be used to implement any of the computing components of the system 100, including, but not limited to, the client device 104 and/or the electronic location 106 and/or the mobile HMI 128. Furthermore, the computing device 102 and/or the electronic location 106 may also be implemented as virtual machines and/or with mirror images to provide load balancing. Functions of the computing device 102 may also be distributed amongst the client device 104 and/or the electronic location 106, thereby obviating the need for an intermediation computing device 102. Similarly, a plurality of computing devices 102 may be provided.

Furthermore, it is understood that the core components of the controller 202, the memory 204, and the communication interface 118, as described in relation to the computing device 102, have analogues in the different form factors of client machines such as those that can be used to implement the client device 104. The client device 104 may be based on computer workstations, laptop computers, tablet computers, mobile telephony devices or the like, and may include any suitable augmented reality and/or virtual reality human-machine interfaces (HMIs) and/or hardware interfaces including, but not limited to, any suitable combination of input devices and output devices (e.g., such as keyboards, pointing devices, microphones, touch devices, speakers. display screens, haptic devices, and the like).

Furthermore, it is understood that the core components of the controller 202, the memory 204, and the communication interface 118, as described in relation to the computing device 102, have analogues in the different form factors of client machines such as those that can be used to implement the mobile HMI 128. The mobile HMI 128 may be based on any suitable robot and/or android and/or drone platform and/the like, and may include any suitable HMIs, and/or hardware interfaces including, but not limited to, any suitable combination of input devices and output devices (e.g., such as keyboards, pointing devices, microphones, touch devices, speakers. display screens, haptic devices, and the like). The mobile HMI 128 may be based on any suitable robot and/or android and/or drone platform and/the like, and may further include any suitable transportation devices, such as wheels, tracks, legs, rotor blades, and the like. The mobile HMI 128 further comprise arms and/or storage compartments for receiving, storing and/or transporting an asset 132-2.

Attention is now directed to FIG. 3, which depicts a flowchart representative of a method 300 for secure assistive handling of electronic content, such as the electronic location 106. The operations of the method 300 of FIG. 3 correspond to machine readable instructions that are executed by the computing device 102, and specifically the controller 202. In the illustrated example, the instructions represented by the blocks of FIG. 3 are stored at the memory 204 for example, as the application 206. The method 300 of FIG. 3 is one way in which the controller 202 and/or the computing device 102 and/or the system 100 may be configured. Furthermore, the following discussion of the method 300 of FIG. 3 will lead to a further understanding of the system 100, and its various components.

Put another way, the computing device 102 may comprise the controller 202 and the memory 204 storing instructions executable on the controller 202, to cause the controller 202 to implement the blocks of the method 300.

The method 300 of FIG. 3 need not be performed in the exact sequence as shown, or with certain blocks omitted, performed in parallel or in a different order than shown. Accordingly, the elements of method 300 are referred to herein as "blocks" rather than "steps." The method 300 of FIG. 3 may be implemented on variations of the system 100, as well.

At a block 302, the controller 202 and/or the computing device 102, trains the machine learning engine 116 using at least one account profile 136 as training data, the at least one account profile 136 indicative of previous content selected or accessed in association with the at least one account profile 136.

For example, the controller 202 and/or the computing device 102 may retrieve the account profile 136, operate the machine learning engine 116 in a training mode to train the machine learning engine 116, and use the account profile 136 as training data. For example, the account profile 136 may store previous search criteria, associated with the user 108, used to search one or more of the locations 106, 122 and/or any other suitable locations, and content previously selected by the user 108 (or the users 108, 140) (e.g., using the client device 104 and/or another client device) from such searches. The previous search criteria, and/or content returned from such searches, may be used as input training data, and content previously selected by the user 108 (or the users 108, 140) may be used as output training data.

However, any suitable data from the account profile 136 may be used as training data to train the machine learning engine 116. In general, the account profile 136 is used to train the machine learning engine 116 to at least filter content received in a search according to preferences of the user 108, or two or more users 108, 140.

Hence, the at least one account profile 136 may be associated with a single user 108. Alternatively, the at least one account profile 136 may be associated with two or more users 108, 140.

Alternatively, and/or in addition, the HMI 120 may communicate with the user 108 via the communication interface 118, for example to ask the user 108 using natural language prompts, for example at the output device 112 to speak and/or enter preferences for selecting content. The user 108 may speak and/or otherwise enter such preferences into the input device 114; when spoken, the preferences may be translated from speech into text by the HMI 120. Regardless, such preferences may be stored in the account profile 136 and may also be used to train the machine learning engine 116.

In some examples, the method 300 may further comprise the controller 202 and/or the computing device 102, prior to training the machine learning engine 116 using the at least one account profile 136 as the training data: training the machine learning engine 116 using the generic profile 138, which may comprise demographic data. Hence, alternatively, or in addition, the method 300 may further comprise the controller 202 and/or the computing device 102, prior to training the machine learning engine 116 using the at least one account profile 136 as the training data: training the machine learning engine 116 one or more of the generic profile 138 and demographic data.

For example, the generic profile 138 may store demographic data and/or previous search criteria, associated with the users of a same and/or similar demographic as the user 108 (or the users 108, 140), used to search one or more of the locations 106, 122 and/or any other suitable locations, and content previously selected by the users of a same and/or similar demographic as the user 108 (or the users 108, 140) from such searches. The previous search criteria, and/or content returned from such searches, may be used as input training data, and content previously selected by the users of a same and/or similar demographic as the user 108 may be used as output training data.

When the generic profile 138 is used to train the machine learning engine 116, such training may be performed in a two stage process. First, the machine learning engine 116 may be trained using the generic profile 138 and/or demographic data to generally train the machine learning engine 116 according to preferences of users of a same and/or similar demographic as the user 108. Second, the machine learning engine 116 may be trained using the account profile 136 to more specifically train the machine learning engine 116 according to preferences of the user 108.

As has been previously described, the generic profile 138 may comprise demographic data for users of different demographics. In these examples, the computing device 102 may process the account profile 136 to determine a demographic of the user 108 (or the users 108, 140) and select the generic profile 138 accordingly to train the machine learning engine 116.

In some examples, the computing device 102 may store different versions of the machine learning engine 116 trained according to preferences of users of different demographics using respective generic profile 138. When training of the machine learning engine 116 according to the account profile 136 is to occur, the computing device 102 may process the account profile 136 to determine a demographic of the user 108 (or the users 108, 140) and select a previously trained version of the machine learning engine 116 trained according to demographic data, and the like, of users having a same or similar demographic as the user 108 (or the users 108, 140), and train the selected version of the machine learning engine 116 using the account profile 136.

In some examples, the method 300 may further comprise the controller 202 and/or the computing device 102 training the machine learning engine 116 in any other suitable manner using any other suitable data as training data from the at least one account profile, the generic profile 138, and the like, amongst other possibilities. Such training may include, but is not limited to, training the machine learning engine 116 (e.g., layers thereof) to one or more of: select locations 106, 122 to search; perform the searching; and the like, amongst other possibilities.

At a block 304, the controller 202 and/or the computing device 102, after training the machine learning engine 116, receives, via one or more of a communication interface 118 and a human-machine interface 120, 128, criteria for selecting content.

For example, the user 108 may operate the client device 104 to enter criteria (e.g., search criteria), and the client device 104 may provide and/or transmit the criteria to the computing device 102, which receives the criteria via the communication interface 118.

Alternatively, and/or in addition, the HMI 120 may communicate with the user 108 via the communication interface 118, for example to ask the user 108 using natural language prompts, for example at the output device 112 to speak and/or enter criteria for selecting content. The user 108 may speak and/or otherwise enter the criteria into the input device 114; when spoken, the criteria may be translated from speech into text by the HMI 120.

Alternatively, and/or in addition, the mobile HMI 128 may communicate with the user 108 via the communication interface 118, a respective communication interface, and/or the mobile HMI 128 may visit the user 108, for example to ask the user 108 using natural language prompts, for example at an output device of the mobile HMI 128, to speak and/or enter criteria for selecting content. The user 108 may speak and/or otherwise enter the criteria into an input device of the mobile HMI 128, which may provide the criteria to the computing device 102 via the communication interface 118. When spoken, the criteria may be translated from speech into text by the mobile HMI 128.

At a block 306, the controller 202 and/or the computing device 102, searches, for content that meets the criteria, using one or more of the communication interface 118, the machine learning engine 116, and a human-machine interface 120, 128.

In particular examples, the controller 202 and/or the computing device 102 may search, via one or more of the communication interface 118, a human-machine interface 120, 128, and the machine learning engine 116 for content 130 that meets the criteria by interfacing with one or more of at least one content platform (e.g., the electronic location 106) and at least one human (e.g., the human user 126 at the physical location 122).

For example, a searching application, of the machine learning engine 116 and/or the application 206, may communicate, via the communication interface 118, with a content platform of the electronic location 106 to perform the search. In particular, the searching application, of the machine learning engine 116 and/or the application 206 may enter the criteria into a search field of a content platform of the electronic location 106, and the content platform of the electronic location 106 may return search results comprising the content 130 that meets the criteria.

Alternatively, and/or in addition, an avatar may be controlled to navigate a metaverse environment to perform the search In other examples, a searching application, of the machine learning engine 116 and/or the application 206, may call, via the communication interface 118, the communication device 124 and the HMI 120 may interact with the human user 126 who may operate the communication device 124 to answer the call. The HMI 120 may verbally provide the human user 126 with the criteria, and the human user 126 may verbally provide indications of the content 130-2 that meets the criteria on the call. The HMI 120 may convert such indications of the content 130-2 to text, and the like, representing the content 130-2 that meet the criteria.

In other examples, the mobile HMI 128 may be controlled to physically visit the physical location 122, and interact with the human user 126. The mobile HMI 128 may verbally provide the human user 126 with the criteria, and the human user 126 may verbally provide indications of the content 130-2 that meets the criteria. The mobile HMI 128 may convert such indications of the content 130-2 to text, and the like, representing the content 130-2 that meet the criteria, and provide such content 130-2 in the form of such text to the computing device 102.

Alternatively, and/or in addition, the mobile HMI 128 may use any suitable input device (e.g., such as a camera, and the like) and/or electronic device (e.g., such as an RFID and/or NFC reader, and the like) to visually and/or electronically search and/or scan the physical location 122 for the content 130-2 that meets the criteria, and provide indications of such content 130-2 to the computing device 102 via a suitable communication link, and the like. In these examples, the mobile HIM 128 may convert such indications of the content 130-2 to text, and the like, representing the content 130-2 that meet the criteria, and provide such content 130-2 in the form of such text to the computing device 102. Such an interaction may occur without interacting with the human user 126.

In some examples, the method 300 may further comprise, the controller 202 and/or the computing device 102, prior to searching for the content 130 that meets the criteria: determining one or more electronic locations 106 or one or more physical locations 122 to perform the searching.

For example, the machine learning engine 116 may be trained to select electronic locations 106 and/or physical locations 122 to perform the searching based on the criteria. For example, the criteria may be for a travel product, and the machine learning engine 116 may select one or more electronic locations 106 comprising content platforms for providing travel products. In examples where the account profile 136 indicates the user 108 has an account and/or a loyalty number with one or more content platforms, the machine learning engine 116 may select electronic locations 106 corresponding to such content platforms.

Similarly, the criteria may be for a travel product, and the machine learning engine 116 may select one or more physical locations 122 corresponding to travel agencies for the machine learning engine 116 and/or the HMI 120 to call and/or for the mobile HMI 128 to visit. In examples where the mobile HMI 128 is to visit a physical location 122, the computing device 102 may dispatch the mobile HMI 128 to the physical location via a suitable command.

Furthermore, in examples where the communication device 124 is to be called and/or a geographic address of a physical location 122 is to be identified to dispatch the mobile HMI 128 thereto, phone numbers and/or geographic addresses of physical location 122 may be identified via a browser operated by an electronic location 106 (e.g., via a search thereof), which may be performed in conjunction with interacting with an electronic location 106 to perform the aforementioned search using the criteria.

It is further understood that as the computing device 102 performs the searching, PII of the user 108 may not be exposed to the electronic location 106 and/or the human user 126.

At a block 308, the controller 202 and/or the computing device 102, receives, via one or more of the communication interface 118 and a human-machine interface 120, 128, the content 130 that meets the criteria.

The content 130 may be received in any suitable format, as has been previously described, and may depend on whether the content 130 is received via interacting with an electronic location 106, via the HMI 120 and/or via the mobile HMI 128.

At a block 310, the controller 202 and/or the computing device 102 filters, via the machine learning engine 116, the content 130 to generate filtered content 130 according to the at least one account profile 136.

For example, the content 130 received at the computing device 102, at the block 308, may comprise a large number of results that meet the criteria received at the block 304, which may be too many for the user 108 to sort through, for example due to their disability or any other suitable reason. As such, the controller 202 and/or the computing device 102 may enter the content 130 as input to the machine learning engine 116, which outputs filtered content 130 selected according to preferences of the user 108 indicated by the at least one account profile 136.

At a block 312, the controller 202 and/or the computing device 102, controls an output device to output the filtered content 130.

For example, the controller 202 and/or the computing device 102 may provide the filtered content 130 to the client device 104, which provides the filtered content 130 at the output device 112 so the user 108 may review the filtered content 130.

In some examples, an asset 132 associated with the filtered content 130 may be selected, and/or requested, and the like, such that the asset 132 may be provided to the client device 104 and/or another client device associated with the user 108, and/or to a location associated with the user 108.

For example, the method 300 may further comprise the controller 202 and/or the computing device 102: receiving, via an input device, a selection of an asset 132 represented by the filtered content 130 output to the output device (e.g., at the block 312); and requesting, via one or more of the communication interface 118, the human-machine interface 120, 128, and the machine learning engine 116, the asset 132. In these examples, the input device 114 of the client device 104 may be operated by the user 108 to select an asset 132 represent by the filtered content 130 as output to the output device 112 at the block 312. An indication of the selection may be provided from the client device 104 to the computing device 102, and the selected asset 132 may be requested from the electronic location 106 or the physical location 122.

For example, when the selected asset 132 is provided via the electronic location 106, the computing device 102 may communicate with the electronic location 106 via the communication interface 118 to request the selected asset 132. In some of these examples, the machine learning engine 116 may be trained to request assets 132 and/or to generate requests for assets 132 via various electronic locations 106, which may have specific formats for such requests. Hence, the machine learning engine 116 may generate a request for the selected asset 132 from the indication of the selection received from the client device 104. Alternatively, or in addition, a programmatic algorithm of the application 206 may be used to generate such requests.

In some examples the request may include certain PII associated with the user 108 (e.g., payment information and/or a shipping location), however such information is understood to exclude other PII such as a disability of the user 108 and/or other personal information associated with the user 108.

In other examples, the payment information may comprise a credit card number, and the like, associated with the computing device 102, but not the user 108, and the computing device 102 may invoice the user 108 for any payment without providing payment information of the user 108 to the electronic location 106. Similarly, the shipping information may comprise a shipping location associated with the computing device 102, but not the user 108, and the computing device 102 may have the selected asset 132 shipped to the shipping location, and not a home of the user 108, and send a message to client device 104 to inform the user 108 of the shipping location such that the user 108 may have the selected asset 132 picked up, and the like.

In other examples, when the selected asset 132 is provided via the physical location 122, the computing device 102 may communicate with the communication device 124 at the physical location 122, via the communication interface 118, for example to establish a call therebetween to request selected asset 132. In some of these examples, the machine learning engine 116 may be trained to request assets 132 via calls, for example by generating text that may be used by the HMI 120 to communicate over the call, and/or such functionality may be incorporated into the HMI 120, and/or a programmatic algorithm of the application 206 may provide such functionality. Hence, a combination of the machine learning engine 116, the communication interface 118, and the HMI 120 may generate a request for the selected asset 132 from the indication of the selection received from the client device 104; and/or a combination of the communication interface 118, and the HMI 120 may generate a request for the selected asset 132 from the indication of the selection received from the client device 104. Regardless, the HMI 120 may "speak" to the human user 126 via the communication device 124 to provide any suitable information to request the asset 124. While such information may include certain PII associated with the user 108 (e.g., payment information and/or a shipping location), such information is understood to exclude other PII such as a disability of the user 108 and/or other personal information associated with the user 108. In some examples, the payment information may comprise a credit card number, and the like, associated with the computing device 102, but not the user 108, and the computing device 102 may invoice the user 108 for any payment without providing payment information of the user 108 to the human user 126. Similarly, the shipping information may comprise a shipping location associated with the computing device 102, but not the user 108, and the computing device 102 may provide such a shopping location to the human user 126 on the call, such that the selected asset 132 is shipped to the shipping location and not a home of the user 108. The computing device 102 may send a message to client device 104 to inform the user 108 of the shipping location such that the user 108 may have the selected asset 132 picked up, and the like.

Alternatively, and/or in addition, when the selected asset 132 is provided via the physical location 122, the computing device 102 may dispatch the mobile HMI 128 to the physical location 122, via the communication interface 118, and the mobile HMI 128 may interact with the human user 126 at the physical location 122 to request the asset 132. Such dispatch information may be generated by the machine learning engine 116 and/or a programmatic algorithm of the application 206. Hence, a combination of the machine learning engine 116, the communication interface 118, and the mobile HMI 128 may generate a request for the selected asset 132 from the indication of the selection received from the client device 104; and/or a combination of the communication interface 118, and the mobile HMI 128 may generate a request for the selected asset 132 from the indication of the selection received from the client device 104; and/or the mobile HMI 128 may generate a request for the selected asset 132 from the indication of the selection received from the client device 104

Alternatively, and/or in addition, the mobile HMI 128 may interact with a payment system (e.g., a point-of-sale terminal) at the physical location 122 to pay for the asset 132 using payment information associated with the user 108 and/or the computing device 102, and similarly provide a shipping location associated with the user 108 and/or the computing device 102.

Alternatively, or in addition, the method 300 may further comprise the controller 202 and/or the computing device 102: selecting, via the machine learning engine 116, an asset 132 associated with the filtered content 130; and requesting, via one or more of the communication interface 118, the human-machine interface 120, 128, and the machine learning engine 116, the asset 132. For example, the machine learning engine 116 may be further trained to select an asset 132 from the filtered content 130 (e.g., based on the account profile 136), and such a selected asset 132 may be requested from the electronic location 106 and/or the physical location 122 as previously described.

Put another way, the machine learning engine 116 may be trained to both filter the content 130 at the block 310, and select an asset 132 from the filtered content 130; in some examples, such functionality may be combined, such that filtering of the content 130 at the block 310 may include selection of an asset 132. In these examples, the block 312 may include controlling the output device 112 to provide an indication of the filtered content 130 by providing an indication of the selected asset 132. In some of these examples, the computing device 102 may request the selected asset 132 as has been previously described, without further input from the client device 104. However, in other examples, the computing device 102 may request the selected asset 132 as has been previously described, only in response to receiving confirmation from the client device 104 that the selected asset 132 is to be requested (e.g., by way of the user 108 operating the input device 114 to provide such confirmation).

The method 300 may include other features.

For example, the method 300 may further comprise the controller 202 and/or the computing device 102: searching (e.g., at the block 306) for content that meets the criteria at a plurality of locations (e.g., a combination of one or more of electronic locations 106 and one or more physical locations 122); receiving (e.g., at the block 308) the content that meets the criteria from the plurality of locations; and aggregating (e.g., prior to the block 310 and/or as a component of the block 308 and/or the block 310) the content that meets the criteria from the plurality of locations. Hence, the content that is filtered at the block 310 may comprise content aggregated from a plurality of locations.

In some examples, the method 300 may further comprise the controller 202 and/or the computing device 102: receiving, via an input device (e.g., such as the input device 114), a selection from the filtered content 130, output to the output device (e.g., at the block 312), the selection being of an asset 132 represented by the filtered content 130; and again training the machine learning engine 116 using one or more of the criteria and the content as training input and the selection as training output. For example, the computing device 102 may again place the machine learning engine 116 into a training mode, and use the criteria and/or the content as training input and the selection as training output, such training input and training output labelled as positive training data.

Alternatively, the account profile 136 may be updated to include the criteria, the content and the selection, and the account profile 136 may again be used to train the machine learning engine 116. In some examples, the criteria, the content and the selection may further be stored in the generic profile 138 in association with demographics of the user 108 (however without PII of the user 108), to provide training data for training the machine learning engine 116 according to preferences of users of a same and/or similar demographic as the user 108.

Alternatively, the method 300 may further comprise the controller 202 and/or the computing device 102: determine that given filtered content 130 is not selected; and again training the machine learning engine 116 using the criteria as training input and the given filtered content 130 that is not selected as training output. For example, the computing device 102 may again place the machine learning engine 116 into a training mode, and use the criteria and as training input and the given filtered content 130 that is not selected as training output, such training input and training output labelled as negative training data.

The method 300 may be further modified. For example, the block 302 may be replaced by the controller 202 and/or the computing device 102 training the machine learning engine 116 using generic profile 138 as training data, the generic profile 138 indicative of previous content selected or accessed or interacted with, in association account profiles (e.g., associated with other users) associated with a same and/or similar demographic associated with the at least one account profile 136 and/or the user 108. In the examples, the block 310 may be replaced by the controller 202 and/or the computing device 102 filtering, via the machine learning engine 116, the content 130 to generate filtered content 130 according to the generic profile 138.

Hence, in these examples, rather than generating filtered content 130 (e.g., and optionally selecting an asset 132 therefrom) based on the account profile 136, the filtered content 130 is generated (e.g., and optionally selecting an asset 132 therefrom) based on the generic profile 138. The remainder of the method 300 may be modified accordingly.

Attention is next directed to FIG. 4, FIG. 5, FIG. 6, FIG. 7 and FIG. 8 which depict an example of aspects of the method 300. FIG. 4, FIG. 5, FIG. 6, FIG. 7 and FIG. 8 are substantially similar to FIG. 1, with like components having like numbers. While for simplicity not all components of FIG. 1 are depicted in FIG. 4, FIG. 5, FIG. 6, FIG. 7 and FIG. 8 such components are nonetheless understood to be present, unless otherwise described.

Figure 4:
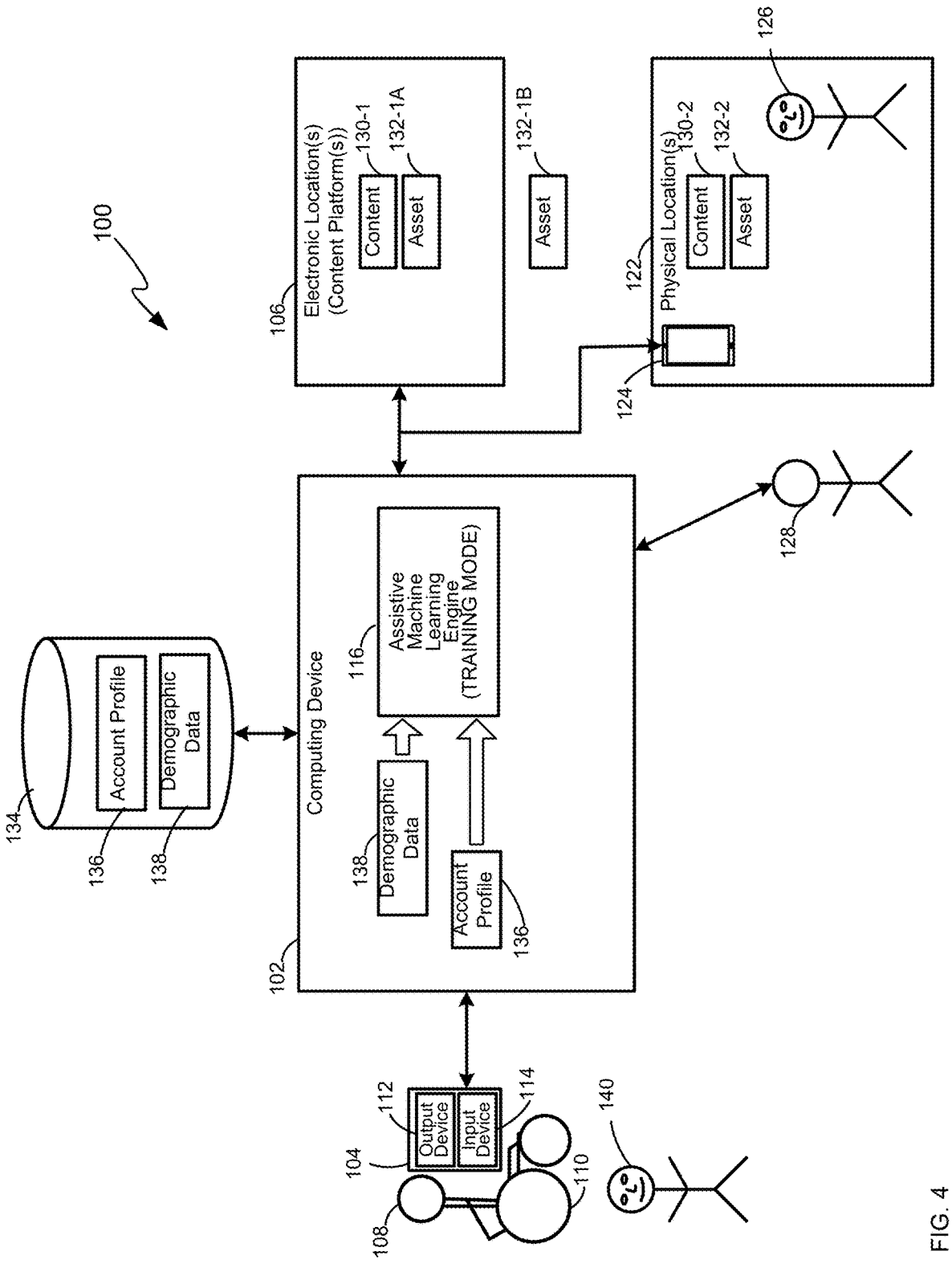
FIG. 4 depicts the system of FIG. 1 implementing aspects of a method for secure assistive handling of electronic content, according to non-limiting examples.

Attention is next directed to FIG. 4, which depicts the computing device 102 operating the machine learning engine 116 in a training mode to, initially and optionally, train the machine learning engine 116 using the generic profile 138 as training data. FIG. 4 further depicts the computing device 102, after optionally training the machine learning engine 116 using the generic profile 138, training (e.g., at the block 302 of the method 300) the machine learning engine 116 using the account profile 136 as training data. Alternatively, or in addition, the generic profile 136 may be used as training data to train the machine learning engine 116.

In particular, in this example, it is understood that the machine learning engine 116 is at least trained to filter content to implement the block 310 of the method 300.

Figure 5:
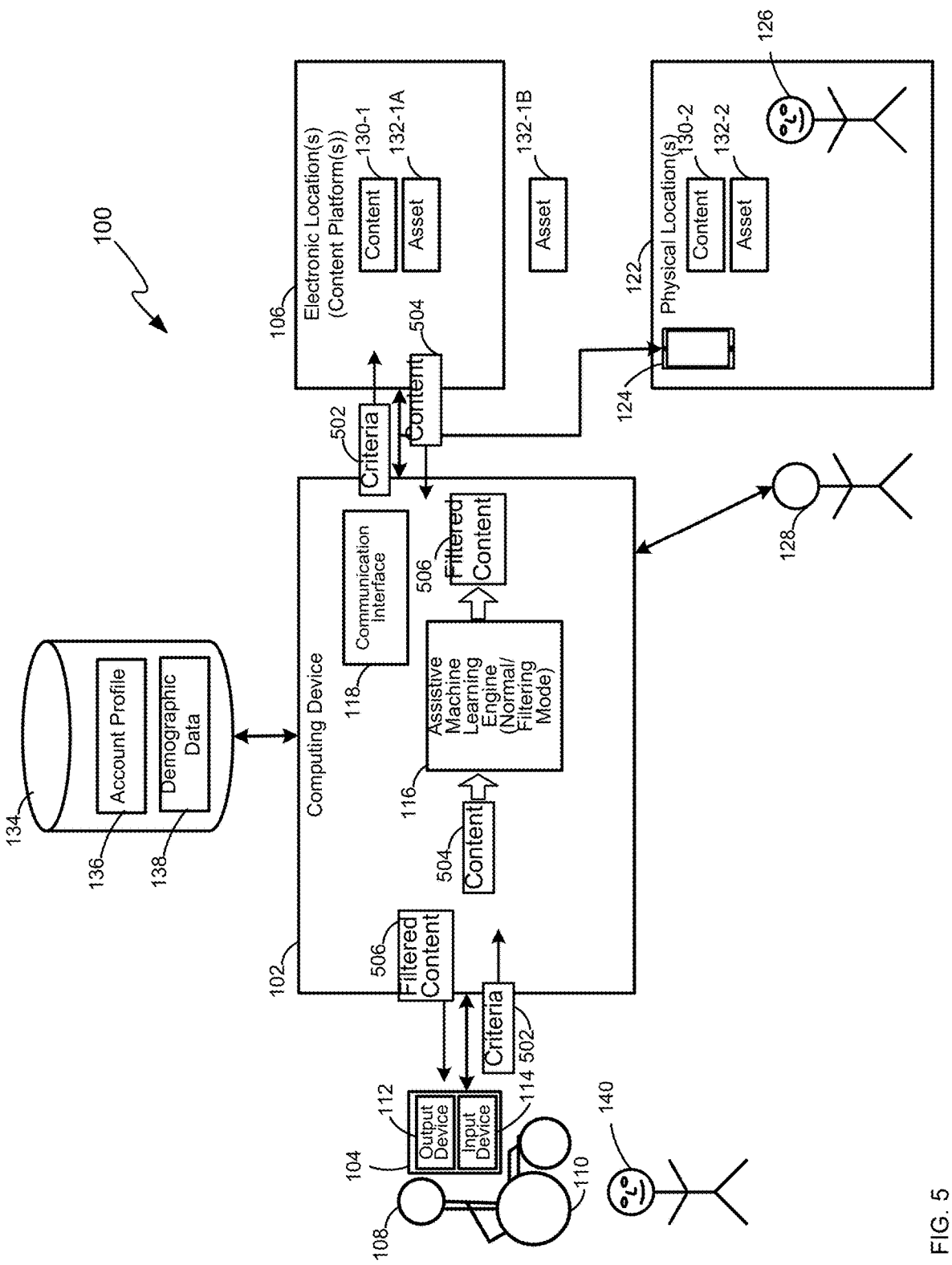
FIG. 5 depicts the system of FIG. 1 implementing further aspects of a method for secure assistive handling of electronic content, according to non-limiting examples.

Attention is next directed to FIG. 5, which depicts one example of the blocks 304, 306, 308, 310 and 312 of the method 300.

FIG. 5 depicts the computing device 102, after training the machine learning engine 116, receiving (e.g., at the block 304 of the method 300) criteria 502 for selecting content 130 from the client device 104.

FIG. 5 further depicts the computing device 102 searching (e.g., at the block 306 of the method 300) for content 130 that meets the criteria 502 at the electronic location 106. For example, as depicted, the criteria 502 may be provided to the electronic location 106 in any suitable format, which may be the same as, or different from, the format in which the criteria 502 was provided by the client device 104.

As also depicted in FIG. 5, the computing device 102 receives (e.g., at the block 308 of the method 300), from the electronic location 106, content 504 (e.g., a subset of the content 130-1) that meets the criteria 502.

FIG. 5 further depicts the computing device 102 operating the machine learning engine 116 in a normal and/or filtering mode (e.g., the computing device 102 changes a mode of the machine learning engine 116 from the training mode of FIG. 4 to the normal and/or filtering mode of FIG. 5 where the machine learning engine 116 is operated to provide the filtering content functionality for which the machine learning engine 116 was trained in the training mode). The computing device 102 filters (e.g., at the block 310 of the method 300) the content 504 to generate filtered content 506 via the machine learning engine 116, for example by inputting the content 504 into the machine learning engine 116 which outputs the filtered content 506.

FIG. 5 further depicts the computing device 102 outputting (e.g., at the block 312 of the method 300) the filtered content 506 to the output device 112, by providing and/or transmitting the filtered content 506 to the client device 104. As has been previously described, a selection of an asset 132 indicated by the filtered content 506 may occur via the input device 114, and is described in more detail with respect to FIG. 8.

Figure 6:
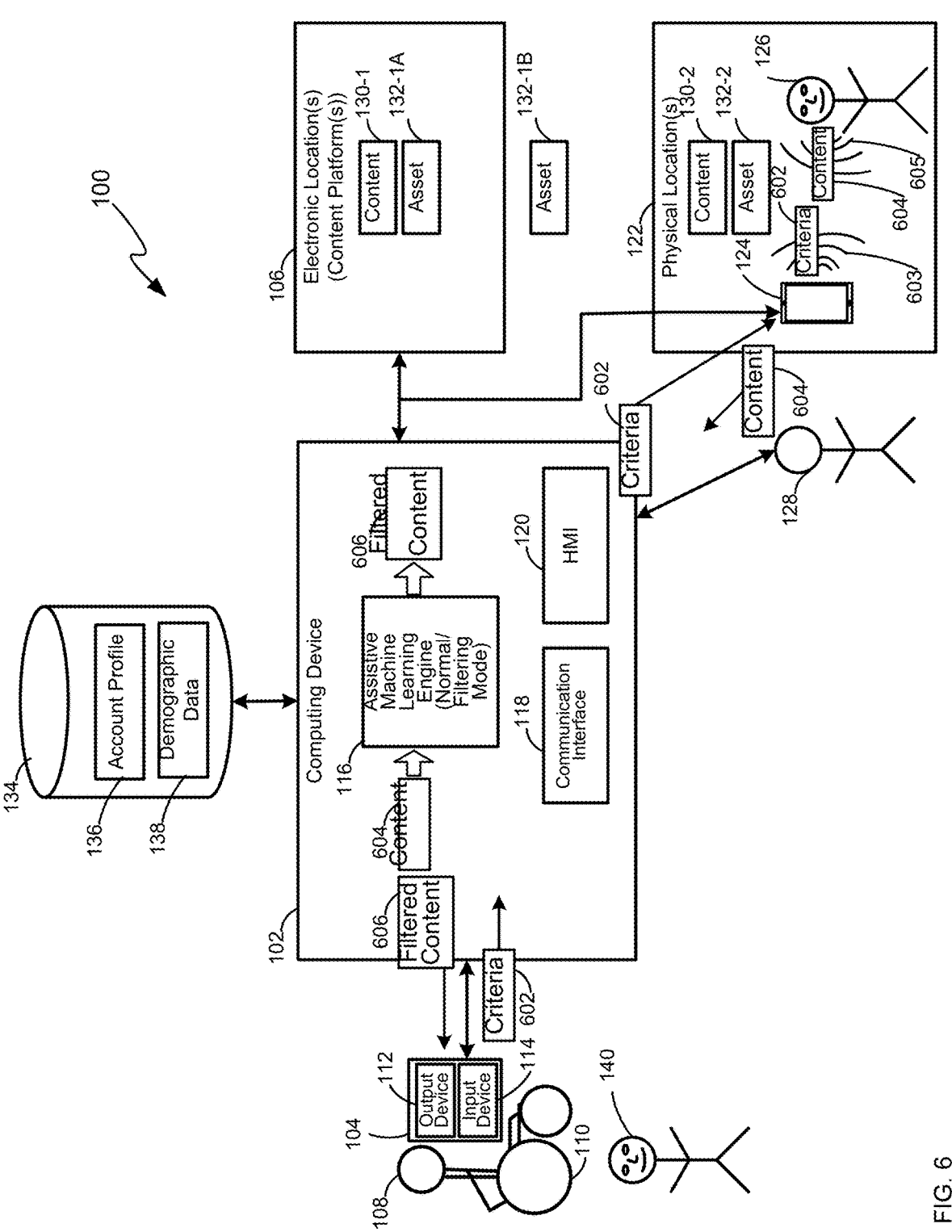
FIG. 6 depicts the system of FIG. 1 implementing yet further aspects of a method for secure assistive handling of electronic content, according to non-limiting examples.

Attention is next directed to FIG. 6, which depicts another example of the blocks 304, 306, 308, 310 and 312 of the method 300.

FIG. 6 depicts the computing device 102, after training the machine learning engine 116, receiving (e.g., at the block 304 of the method 300) criteria 602 for selecting content 130 from the client device 104 (e.g., similar to as depicted in FIG. 5).

FIG. 6 further depicts the computing device 102 searching (e.g., at the block 306 of the method 300) for content 130 that meets the criteria 602 at the physical location 122.

For example, as depicted, the computing device 102 may make a call to the communication device 124 (e.g., via respective communication links therebetween and the communication interface 118), and the HMI 120 may provide the criteria 602 on the call, for example in a format of speech data, which may be output by a speaker of the communication device 124 as sound 603, for example in a conversation with the human user 126. For example, the HMI 120 may provide the criteria 602 in a verbal query such as "I am searching for [CRITERIA]. Do you sell this?", where [CRITERIA] comprises the criteria 602 in a speech format. The human user 126 may provide indications of the content 604 (e.g., a subset of the content 130-2) that meets the criteria 602 in sound 605, which is received at a microphone of the communication device 124 and provided back to the HMI 120 via the communication interface 118. For example, the indications of the content 604 may comprise the speaker saying "Yes we sell these specific types of [CONTENT]", where [CONTENT] comprises the content 604 in a speech format the like.

FIG. 6 further depicts the computing device 102 operating the machine learning engine 116 in the normal and/or filtering mode. The computing device 102 filters (e.g., at the block 310 of the method 300) the content 604 to generate filtered content 606 via the machine learning engine 116, for example by inputting the content 604 into the machine learning engine 116 which outputs the filtered content 606. FIG. 6 further depicts the computing device 102 outputting (e.g., at the block 312 of the method 300) the filtered content 606 to the output device 112, by providing and/or transmitting the filtered content 606 to the client device 104. As has been previously described, a selection of an asset 132 indicted by the filtered content 606 may occur via the input device 114.

Figure 7:
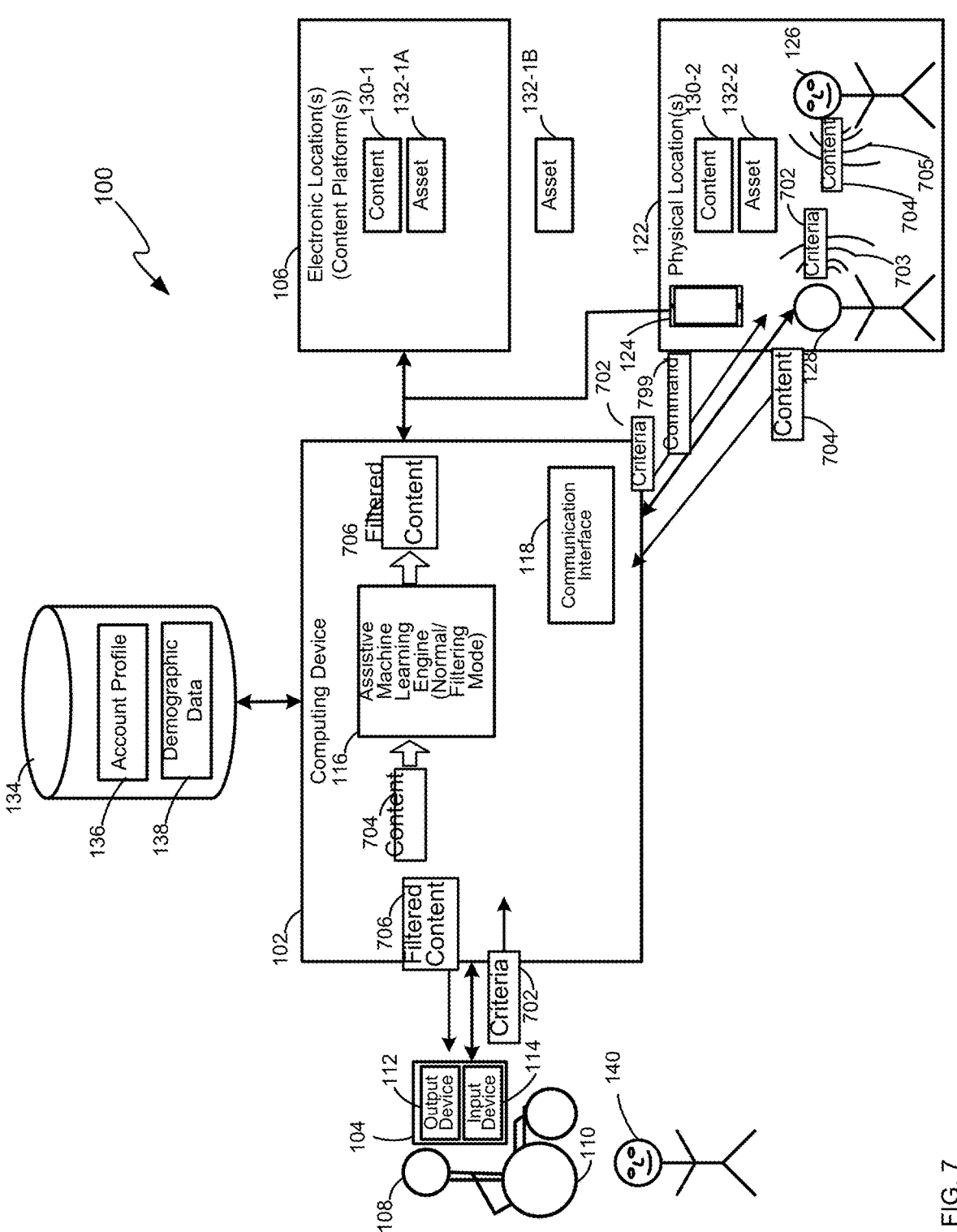
FIG. 7 depicts the system of FIG. 1 implementing yet further aspects of a method for secure assistive handling of electronic content, according to non-limiting examples.

Attention is next directed to FIG. 7, which depicts another example of the blocks 304, 306, 308, 310 and 312 of the method 300.

FIG. 7 depicts the computing device 102, after training the machine learning engine 116, receiving (e.g., at the block 304 of the method 300) criteria 702 for selecting content 130 from the client device 104 (e.g., similar to as depicted in FIG. 5).

FIG. 7 further depicts the computing device 102 searching (e.g., at the block 306 of the method 300) for content 130 that meets the criteria 702 at the physical location 122.

For example, as depicted, the computing device 102 may control the mobile HMI 128 to travel to the physical location 122, for example via any suitable command 799 which may include the address of the physical location 122, transmitted to the mobile HMI 128 via a wireless communication link therebetween, and via the communication interface 118. The computing device 102 may further provide the criteria 702 to the mobile HMI 128 via the wireless communication link.

At the physical location 122, the mobile HMI 128 may provide the criteria 702, for example in a format of speech data, which may be output by a speaker of the mobile HMI 128 as sound 703, for example in a conversation with the human user 126. For example, the HMI 120 may provide the criteria 702 in a verbal query such as "I am searching for [CRITERIA]. Do you sell this?", where [CRITERIA] comprises the criteria 702 in a speech format. The human user 126 may provide indications of the content 704 (e.g., a subset of the content 130-2) that meets the criteria 702 in sound 705, which is received at a microphone of the mobile HMI 128 and provided back to computing device 102 via the communication interface 118 and the wireless communication link. For example, the indications of the content 704 may comprise the speaker saying "Yes we sell these specific types of [CONTENT]", where [CONTENT] comprises the content 704 in a speech format the like.

FIG. 7 further depicts the computing device 102 operating the machine learning engine 116 in the normal and/or filtering mode. The computing device 102 filters (e.g., at the block 310 of the method 300) the content 704 to generate filtered content 706 via the machine learning engine 116, for example by inputting the content 704 into the machine learning engine 116 which outputs the filtered content 706. FIG. 7 further depicts the computing device 102 outputting (e.g., at the block 312 of the method 300) the filtered content 706 to the output device 112, by providing and/or transmitting the filtered content 706 to the client device 104. As has been previously described, a selection of an asset 132 indicted by the filtered content 706 may occur via the input device 114.

Figure 8:
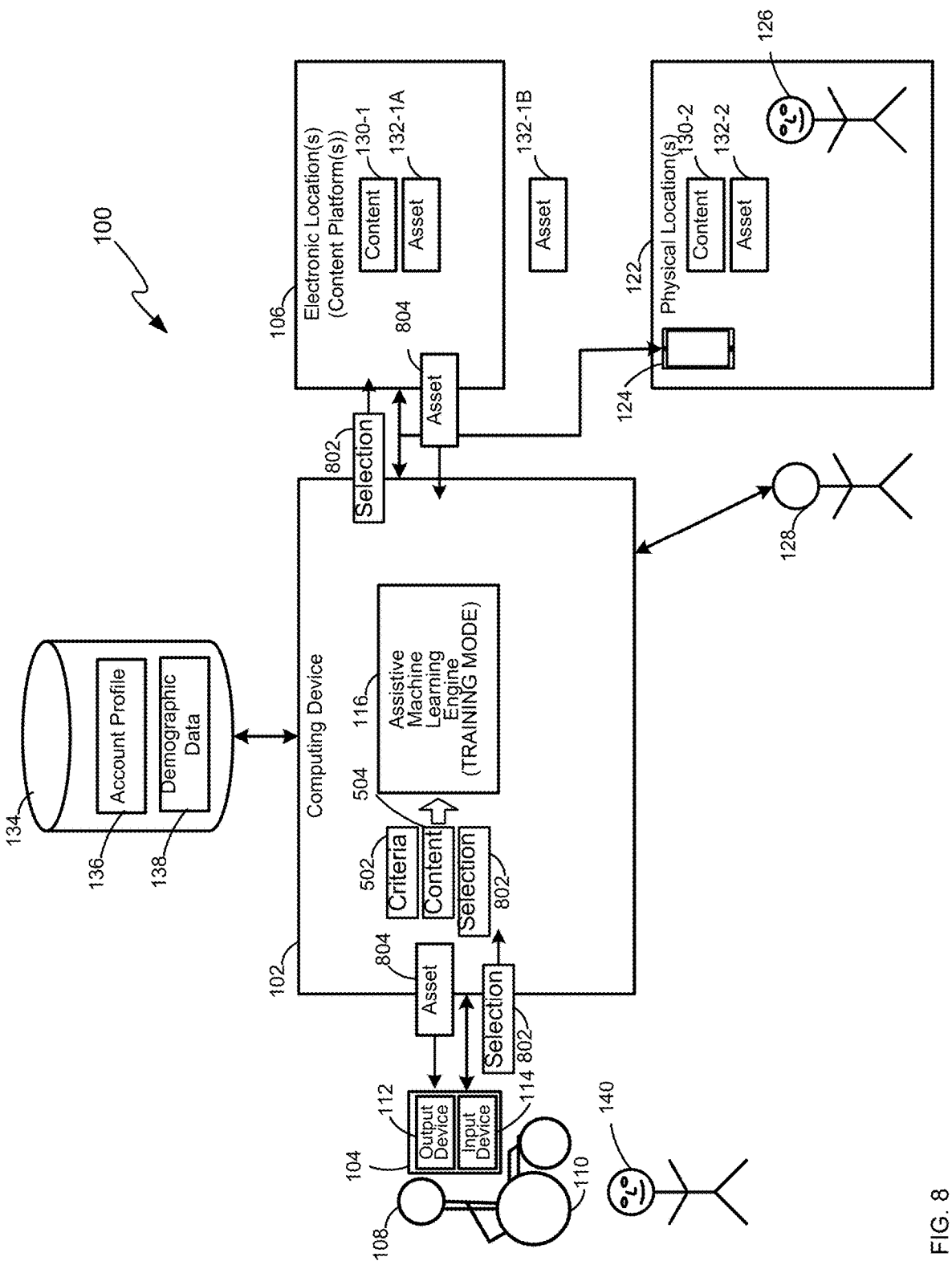
FIG. 8 depicts the system of FIG. 1 implementing yet further aspects of a method for secure assistive handling of electronic content, according to non-limiting examples.

Attention is next directed to FIG. 8 which returns to the example of FIG. 5, and hence it is understood that the filtered content 506 has been output to the client device 104.

As depicted, a selection 802 of an asset 804 (e.g., one or more of the assets 132-1A) represented by the filtered content 506 occurs at the client device 104, and the selection 802 is received at the computing device 102. The computing device 102 provides the selection 802 to the electronic location 106, which returns the asset 804 (e.g., as depicted, in an electronic format), which the computing device 102 provides to the client device 104. While not depicted, the computing device 102 providing the selection 802 to the electronic location 106 may include exchange of payment information, a shipping location, and the like.

As also depicted in FIG. 8, the computing device 102 may again operate the machine learning engine 116 in the training mode, and use the content 504 (and/or the criteria 502) as training input, and the selection 802 as training output, as positive training data. For example, the positive training data may be labelled with a score (not depicted) to indicate that the content 504 (and/or the criteria 502) and the selection 802 is a positive outcome for the machine learning engine 116. Hence, the machine learning engine 116 may be trained to operate more efficiently on the basis of such additional training. Indeed, the example of FIG. 4, FIG. 5 and FIG. 8 may comprise a machine learning feedback loop. While not depicted, the content 504 (and/or the criteria 502) and the selection 802 may be stored at the account profile 136 and/or the generic profile 138 at the memory 134, and such an updated account profile 136 and/or updated generic profile 138 may alternatively and/or additionally be used as positive training data for training the machine learning engine 116.

Furthermore, the example of FIG. 8 may be adapted for selection of a physical asset 132 in the examples of FIG. 6 and FIG. 7, but providing a selected physical asset 132 in such examples may occur by way of physically shipping the selected physical asset 132. Training of the machine learning engine 116 may further occur according to a selection of a physical asset 132.

It is further understood that while examples provided herein are described with respect to a user with a disability, the method 300 may be implemented with respect to users without disabilities.

It is furthermore understood that, using a travel industry example, search criteria (e.g., the criteria 502, 602, 702) described herein may be for a trip that is to occur from an origin location to a destination location on specific dates, and the computing device 102 may repeat any suitable aspects of the method 300, any suitable number of times, to generate filtered content 506, 606, 706 corresponding to a combination of flights, hotels, and the like, for the trip.

As should by now be apparent, the operations and functions of the devices described herein are sufficiently complex as to require their implementation on a computer system, and cannot be performed, as a practical matter, in the human mind. In particular, computing devices, and the like, such as set forth herein are understood as requiring and providing speed and accuracy and complexity management that are not obtainable by human mental steps, in addition to the inherently digital nature of such operations (e.g., a human mind cannot act as a proxy device).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is further understood that instance of the term "configured to", such as "a computing device configured to . . . ", "a processor configured to . . . ", "a controller configured to . . . ", and the like, may be understood to include a feature of a computer-readable storage medium having stored thereon program instructions that, when executed by a computing device and/or a processor and/or a controller, and the like, may cause the computing device and/or the processor and/or the controller to perform a set of operations, which may comprise the features that the computing device and/or the processor and/or the controller, and the like, are configured to implement. Hence, the term "configured to" is understood not to be unduly limiting to means plus function interpretations, and the like.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Unless the context of usage unambiguously indicates otherwise, articles "a," "an," and "the" should not be interpreted as meaning "one" or "only one." Rather such articles should be interpreted as meaning "at least one" or "one or more." Similarly, when the terms "the" or "said" are used to refer to a noun previously introduced by the indefinite article "a" or "an," "the" and "said" mean "at least one" or "one or more" unless the usage unambiguously indicates otherwise.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", in yet further examples "within 0.5%", and in yet further examples "within 0.1%".

Persons skilled in the art will appreciate that in some examples, the functionality of devices and/or methods and/or processes described herein may be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein may be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program may be stored as a computer program product comprising a computer usable medium. Further, a persistent storage device may comprise the computer readable program code. It is yet further appreciated that the computer-readable program code and/or computer usable medium may comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium may be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:

training, via a computing device, one or more machine learning engines using at least one account profile as training data, the at least one account profile indicative of previous content selected or accessed in association with the at least one account profile;

after training the one or more machine learning engines, receiving, at the computing device, via a communication interface, when receiving input in an electronic format, or via the communication interface and a human-machine interface when receiving respective input in a speech format, criteria for selecting content;

searching, via the computing device, in one or more electronic locations, one or more physical locations or one or more virtual reality environments, for content that meets the criteria, using the communication interface when receiving the input in an electronic format, or using the communication interface and the human-machine interface when receiving the respective input in the speech format;

receiving, via the computing device, via the communication interface, when receiving answers in the electronic format, or via the communication interface and the human-machine interface when receiving respective answers in the speech format, the content that meets the criteria;

filtering, via the computing device, via the one or more machine learning engines, the content to generate filtered content according to the at least one account profile; and controlling, via the computing device, an output device to output the filtered content.

2. The method of claim 1, further comprising, prior to training the one or more machine learning engines using the at least one account profile as the training data:

training the one or more machine learning engines using one or more of a generic profile and demographic data.

3. The method of claim 1, further comprising, prior to searching for the content that meets the criteria:

determining the one or more electronic locations, the one or more physical locations or the one or more virtual reality environments to perform the searching.

4. The method of claim 1, further comprising:

selecting, via the one or more machine learning engines, an asset associated with the filtered content; and requesting, via the communication interface when the filtered content is in the electronic format, or via the communication interface and the human-machine interface when the filtered content is in the speech format, the asset.

5. The method of claim 1, further comprising:

receiving, via an input device, a selection of an asset represented by the filtered content output to the output device; and requesting, via the communication interface when the filtered content is in the electronic format, or via the communication interface and the human-machine interface when the filtered content is in the speech format, the asset.

6. The method of claim 1, further comprising:

receiving, via an input device, a selection from the filtered content output to the output device, the selection being of an asset represented by the filtered content; and again training the one or more machine learning engines using one or more of the criteria and the content as training input and the selection as training output.

7. The method of claim 1, wherein the at least one account profile is associated with a single user or two or more users.

8. The method of claim 1, further comprising:

searching for the content that meets the criteria in the one or more electronic locations using the electronic format via the communication interface, by interfacing with at least one content platform, or searching for the content that meets the criteria in the one or more physical locations or the one or more virtual locations via the communication interface and the human-machine interface using the speech format by interfacing with at least one human.

9. The method of claim 1, wherein the computing device further comprises an assistive machine-learning engine, which assists in searching, using the assistive machine-learning engine and the communication interface in case of the electronic format in one or more electronic locations, or using the assistive machine-learning engine, the communication interface and the human-machine interface in case of the speech format in the one or more physical locations or the one or more virtual locations.

10. The method of claim 1, wherein the human-machine interface is a mobile human-machine interface.

11. A computing device comprising:

a controller; and a computer-readable storage medium having stored thereon program instructions that, when executed by the controller, causes the controller to perform a set of operations comprising:

training one or more machine learning engines using at least one account profile as training data, the at least one account profile indicative of previous content selected or accessed in association with the at least one account profile;

after training the one or more machine learning engines, receiving, at the computing device, via a communication interface, when receiving input in an electronic format, or via the communication interface and a human-machine interface when receiving respective input in a speech format, criteria for selecting content;

searching, via the computing device, in one or more electronic locations, one or more physical locations or one or more virtual reality environments, for content that meets the criteria, using the communication interface when receiving the input in an electronic format, or using the communication interface and the human-machine interface when receiving the respective input in the speech format;

receiving, via the computing device, via the communication interface, when receiving answers in the electronic format, or via the communication interface and the human-machine interface when receiving respective answers in the speech format, the content that meets the criteria;

filtering, via the one or more machine learning engines, the content to generate filtered content according to the at least one account profile; and controlling, via the computing device, an output device to output the filtered content.

12. The computing device of claim 11, wherein the set of operations further comprises:

prior to training the one or more machine learning engines using the at least one account profile as the training data:

training the one or more machine learning engines using one or more of a generic profile and demographic data.

13. The computing device of claim 11, wherein the set of operations further comprises, prior to searching for the content that meets the criteria:

determining the one or more electronic locations, the one or more physical locations or the one or more virtual reality environments to perform the searching.

14. The computing device of claim 11, wherein the set of operations further comprises:

selecting, via the one or more machine learning engines, an asset associated with the filtered content; and requesting, via the communication interface when the filtered content is in the electronic format, or via the communication interface and the human-machine interface when the filtered content is in the speech format, the asset.

15. The computing device of claim 11, wherein the set of operations further comprises:

receiving, via an input device, a selection of an asset represented by the filtered content output to the output device; and requesting, via the communication interface when the filtered content is in the electronic format, or via the communication interface and the human-machine interface when the filtered content is in the speech format, the asset.

16. The computing device of claim 11, wherein the set of operations further comprises:

searching for the content that meets the criteria in the one or more electronic locations using the electronic format via the communication interface, by interfacing with at least one content platform, or searching for the content that meets the criteria in the one or more physical locations or the one or more virtual locations via the communication interface and the human-machine interface using the speech format by interfacing with at least one human.

17. The computing device of claim 11, further comprises an assistive machine-learning engine, which assists in searching, using the assistive machine-learning engine and the communication interface in case of the electronic format in one or more electronic locations, or using the assistive machine-learning engine, the communication interface and the human-machine interface in case of the speech format in the one or more physical locations or the one or more virtual locations.

18. The computing device of claim 11, wherein the human-machine interface is a mobile human-machine interface.

19. A non-transitory computer-readable storage medium having stored thereon program instructions that, when executed by a computing device, causes the computing device to perform a method comprising:

training one or more machine learning engines using at least one account profile as training data, the at least one account profile indicative of previous content selected or accessed in association with the at least one account profile;

after training the one or more machine learning engines, receiving, at the computing device, via a communication interface, when receiving input in an electronic format, or via the communication interface and a human-machine interface when receiving respective input in a speech format, criteria for selecting content;

searching, via the computing device, in one or more electronic locations, one or more physical locations or one or more virtual reality environments, for content that meets the criteria, using the communication interface when receiving the input in an electronic format, or using the communication interface and the human-machine interface when receiving the respective input in the speech format;

receiving, via the computing device, via the communication interface, when receiving answers in the electronic format, or via the communication interface and the human-machine interface when receiving respective answers in the speech format, the content that meets the criteria;

filtering, via the one or more machine learning engines, the content to generate filtered content according to the at least one account profile; and controlling an output device to output the filtered content.

20. The non-transitory computer-readable storage medium of claim 19, wherein the method further comprises:

prior to training the one or more machine learning engines using the at least one account profile as the training data:

training the one or more machine learning engines using one or more of a generic profile and demographic data.

21. The non-transitory computer-readable storage medium of claim 19, wherein the computing device further comprises an assistive machine-learning engine, which assists in searching, using the assistive machine-learning engine and the communication interface in case of the electronic format in one or more electronic locations, or using the assistive machine-learning engine, the communication interface and the human-machine interface in case of the speech format in the one or more physical locations or the one or more virtual locations.

22. The non-transitory computer-readable storage medium of claim 19, wherein the human-machine interface is a mobile human-machine interface.

* * * * *